(No Model.)
T. J. FRAZIER.
STEAM MOTOR.
No. 408,229. Patented Aug. 6, 1889.
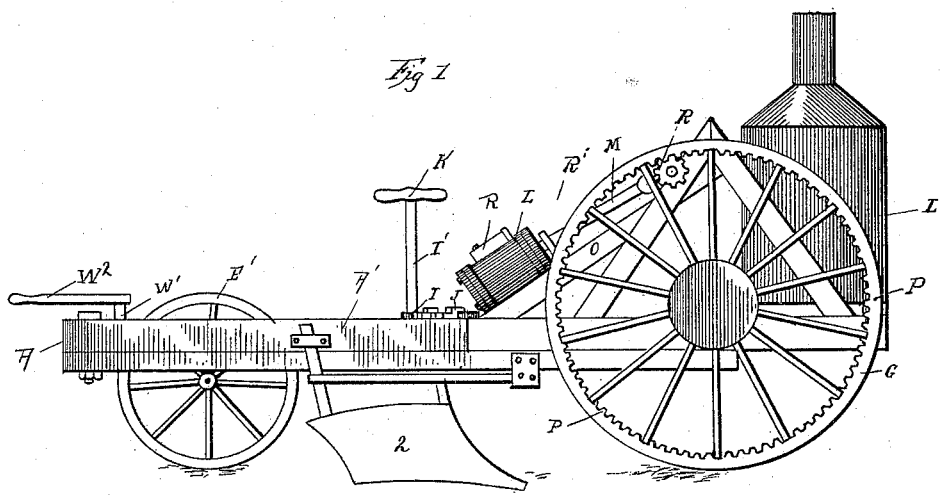
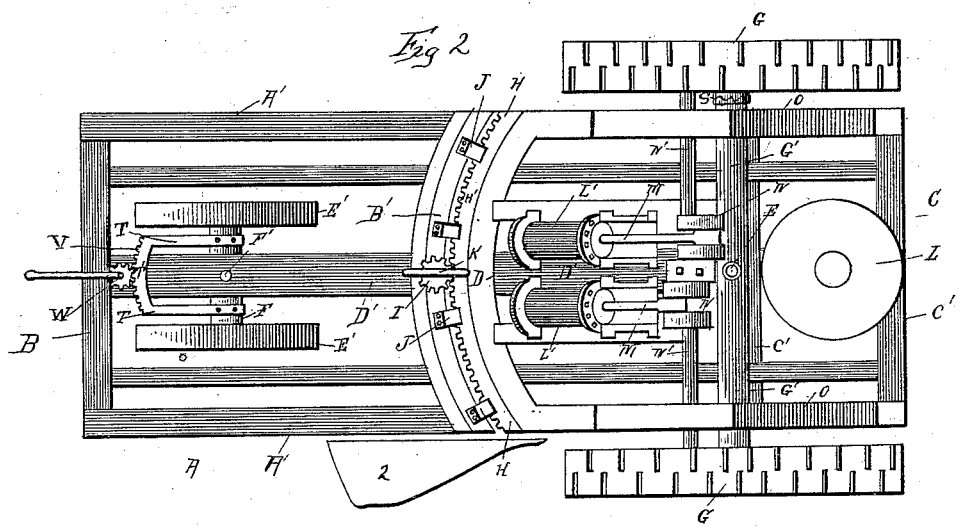
WITNESSES
Edwin L. Yewell
Chas Helm
INVENTOR
Thomas J. Frazier
By John G. Manahan,
Attorney
N. PETERS, Photo-Lithographer, Washington, D. C.

UNITED STATES PATENT OFFICE.

THOMAS JEFFERSON FRAZIER, OF LYONS, IOWA.

STEAM-MOTOR.

SPECIFICATION forming part of Letters Patent No. 408,229, dated August 6, 1889.

Application filed September 27, 1888. Serial No. 286,616. (No model.)

*To all whom it may concern:*

Be it known that I, THOMAS JEFFERSON FRAZIER, a citizen of the United States, residing at Lyons, in the county of Clinton and State of Iowa, have invented certain new and useful Improvements in Steam-Motors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in steam-motors, and has more special reference to mechanism for applying the power to the driving-wheels, and to mechanism for readily guiding the machine or changing its direction.

My invention is adapted for use as a draft-power generally, and can be readily attached to any sort of land conveyance. It is more especially applicable, however, as a means of drawing a series of plows, and is shown in the drawings as applied to that purpose. The power is applied to the upper portion of the front carrying-wheels, which latter are also the driving-wheels. By this means great leverage is obtained upon said driving-wheels, and the latter can be rotated with a proportionately less expense for power. The power is communicated from the twin piston-rods to the driving-wheels through the medium of the pinion rigidly seated on the transverse driving-shaft, which pinion intermeshes with a gear, either internal or external, placed upon the rim of the driving-wheels. In this construction the ground or tread of the wheels furnishes a fulcrum, the carrying-axle represents the weight to be moved, and the driving-pinion aforesaid is located at what might be termed the "power end" of the lever afforded by the carrying-wheel. The application of the power to the driving-wheels, therefore, at or near the top of the latter, has a lever advantage upon the weight to be moved.

One objection to many of the steam-motors in use is the difficulty or inconvenience of guiding, turning, and handling the same. To overcome these I have seated the steam-generator and engine upon the front frame and pivoted the latter centrally in the forward end of the reach which underlies said front frame. It is feasible, therefore, to turn the front frame upon its forward central pivot aforesaid at almost a right angle with the residue or rear portion of the machine, there being nothing to impede the turning of either of the front carrying-wheels backward and in front of the rear frame until the central reach aforesaid is met. This permits the machine to be turned in a comparatively small area, and to further expedite the change of direction aforesaid, where an unusually short turn is desired, the rear carrying-wheels are also centrally pivoted in their common axle and adapted to have their direction changed reversely to that of the front wheels, thereby carrying the rear part of the frame circularly in the direction opposite to that taken by the front wheels, the effect being to simultaneously twist the respective ends of the entire frame in opposite directions from the center thereof.

In the drawings, Figure 1 is a side elevation of a machine embodying my invention and exhibiting the mode of attaching the plows thereto. Fig. 2 is a plan of the essential parts of my invention as embodied in said machine.

A is the rear frame, constituted of two parallel side plates A', one rear-end plate B, suitably framed in the rear ends of the side plates A' at right angles thereto, and a front circularly-formed end plate B', suitably attached at each end to the side plates aforesaid.

The front frame C consists of the parallel side plates, front cross-plate, and intermediate cross-plate C', and a rear circularly-shaped cross-plate D. At its rear end a longitudinal reach D' is attached rigidly under the center of the rear plate B, and extending forward under the cross-plates B' and D is pivoted at its front end under the central cross-plate C' of the front frame by a vertical king-bolt E. The rear frame is substantially carried on two rear carrying-wheels E', journaled on a cross-axle F, which latter is centrally pivoted under the reach D' by means of the vertical king-bolt F'. The front frame is substantially carried on suitable carrying-wheels G G, located exteriorly to said frame upon a transverse axle G', suitably journaled to said frame at each side thereof.

A circular iron plate H is seated on the upper surface and along the rear edge of the rear cross-plate D of the front frame and has the same curvature as said plate D. The rear edge of the iron plate H is provided with a series of cogs H′, which project over the front upper edge of the front cross-plate B′ of the rear frame, and are adapted to be engaged by a horizontal pinion I, seated centrally in said plate B′ on a vertical axle I′, extending through plate B′ and reach D.

On the upper surface of the plate B′ at suitable intervals are rigidly attached a series of cleats J, the front ends of which project over the upper surface of the bar H and collectively form ways for the lateral movements of said bar in the changed direction of the front frame. On the upper end of the axle I′, to which the pinion I is rigidly attached, is affixed the guiding-handle K, by means of which, through the medium of the pinion I and rack-plate H′, the rear end of the front frame may be moved laterally, the front frame turning upon its forward pivot E, and thereby any desired change of direction may be given to said machine.

On the front frame, in front of the carrying-axle G′, is suitably seated the usual boiler and furnace L, and on the front frame, behind said carrying-axle, is seated the twin steam-cylinders L′. The outer ends of the piston-rods M are pivotally attached to the elbow-crank N of the transverse driving-shaft N′, the latter being suitably journaled above the side plates C′ of the front frame on upwardly-converging braces O O, suitably seated at their lower ends in said side plates, respectively.

On the side of the rim of the carrying-wheels G is formed the internal gear P, and the driving-shaft N′ is elevated to such sufficient height that the pinion R seated thereon may engage said gear P, and thereby the rotation of the shaft N′ is communicated to said carrying-wheels G at or near the top of the latter. The gear P may be an external gear, if desired, the locality of the pinion R being changed to correspond, my object in this behalf being to apply the power to the rim of the wheel G near the top of the latter.

There is a steel pipe for the transmission of the steam from the boiler L to the cylinder L′, and as this construction can be optional, and in any of the obvious modes, I do not deem a special description thereof necessary.

R′ is the steam-chest containing the usual valve-seats.

An ordinary clutch S and clutch-lever S′ are provided at one end of the driving-axle N′, so as to optionally suspend the attachment of one of the pinions R of the shaft N′ for the purpose of turning the machine.

On the rear axle F are rigidly attached the rearwardly-converging arms T T, which are joined at the rear ends by a transverse plate T′, on the rear surface of which is formed the rack V, adapted to be engaged and moved laterally by pinion W, seated adjacently on the reach D′. On the upper end of the axle W′ of the pinion W can be attached a handle W², and by this means the pinion W rotated and the rack V moved laterally, thereby turning the axle F and rear carrying-wheels E′ upon their central pivot F′ to assist in making a short turn of the machine. A clutch V′, seated on the reach D′ and extending over the front edge of the plate T′, affords a way for the latter. The axle W′ may be locked with the usual dog 1, seated at any suitable place on the rear frame, and thus the rear axle V be held at right angles with the frame A, except at such times as it may be desired to change the direction of the rear carrying-wheels.

The plows 2 2 are shown in Fig. 1 attached to the outside of the rear frame; but the same may be attached in any other suitable manner.

What I claim as my invention, and desire to secure by Letters Patent of the United States, is—

1. The combination of the front frame C, provided with the circular rear plate D and plate H, the carrying-wheels G, axle G′, rear frame A, provided with ways J, carrying-wheels E′, axle F, reach D′, and pivot E, substantially as shown, and for the purpose described.

2. The combination of the front frame C, suitably supported upon carrying-wheels G and provided with the rear transverse circular rack H, the rear frame A, suitably supported upon the carrying-wheels E′ and provided with the pinion I, means for rotating said pinion, reach D′, and pivot E, substantially as shown, and for the purpose described.

3. The combination of the front frame C, suitably supported upon carrying-wheels G and provided with the rear circular rack H, and adapted to carry the boiler L, cylinders L′ and their adjunctive parts, the rear frame A, suitably supported upon carrying-wheels E′, pinion I, adapted to engage and move the rack H, means for rotating said pinion, transverse rack T′, pinion W, and means for locking and means for actuating said last-named pinion, reach D′, and pivot E, substantially as shown, and for the purpose described.

4. The combination of frame C, axle G′, wheels G, provided with internal gear P, braces O O, seated on said frame, driving-shaft N′, journaled on said braces and provided with elbow-crank N, pinions R, seated on shaft N′ and adapted to engage gear P at or near the top of wheels G, respectively, inclined cylinders L′, and pistons M, pivotally attached to said elbow-crank, substantially as shown, and for the purpose described.

In testimony whereof I affix my signature in presence of two witnesses.

THOMAS JEFFERSON FRAZIER.

Witnesses:
JOHN G. MANAHAN,
VIRGIL S. FERGUSON.